Figure 1:
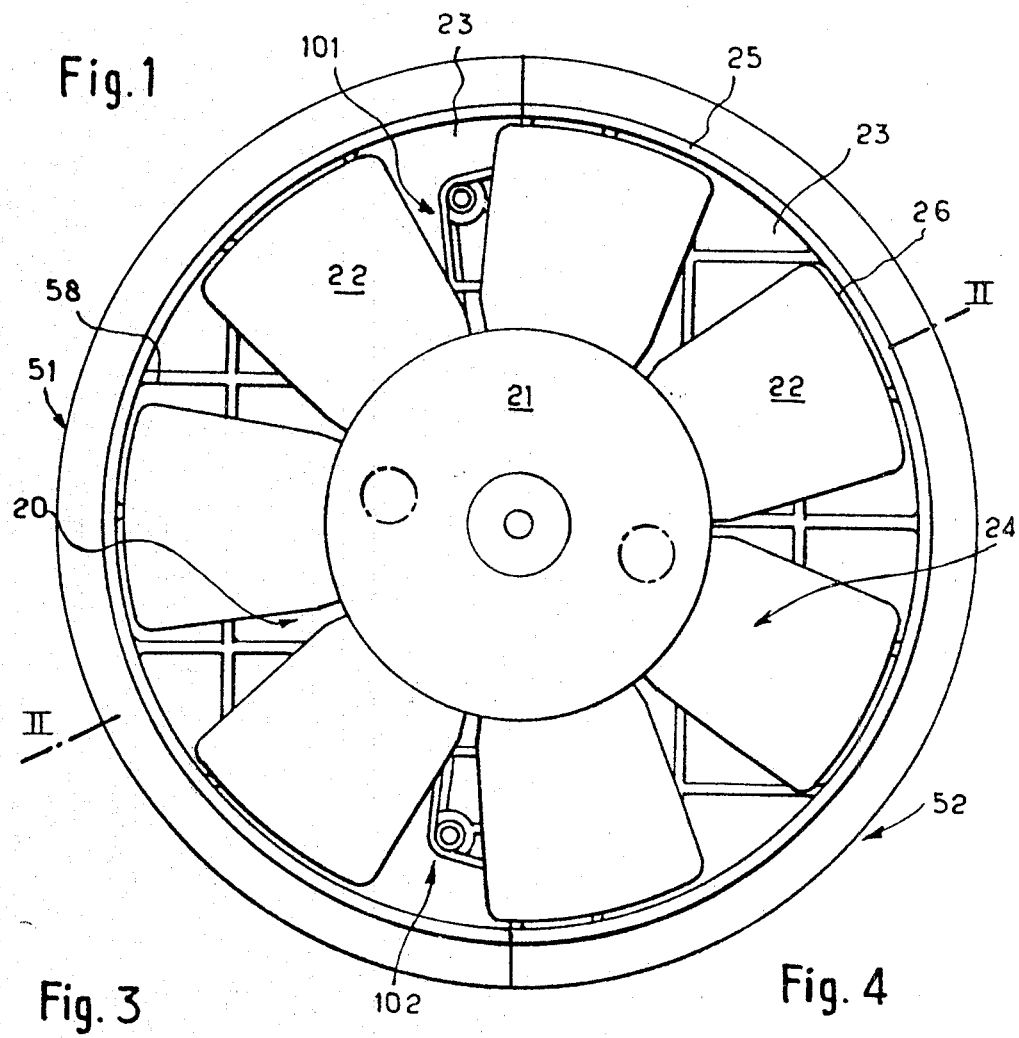

United States Patent [19]

Jacquet et al.

[11] 4,335,646
[45] Jun. 22, 1982

[54] VEHICLE AIR CONDITIONER BLOWER AND MOUNT

[75] Inventors: Maurice A. Jacquet, Maurepas; Jean-Pierre Lignereux, Beynes, both of France

[73] Assignee: Societe Anonyme Francaise du Ferodo, Paris, France

[21] Appl. No.: 143,316

[22] Filed: Apr. 24, 1980

[30] Foreign Application Priority Data

Apr. 24, 1979 [FR] France .............................. 79 10558

[51] Int. Cl.³ .......................... F16M 1/04; B60H 1/26
[52] U.S. Cl. .......................................... 98/2; 98/2.05;
248/672; 416/247 R; 417/424
[58] Field of Search ............... 98/2, 2.05; 237/12.3 A;
248/637, 671, 672, 674; 415/185, 217; 416/247
R; 417/424; 310/62, 63, 67

[56] References Cited

U.S. PATENT DOCUMENTS

| | | | |
|---|---|---|---|
| 1,866,846 | 7/1932 | Fink | 248/672 |
| 2,488,945 | 11/1949 | Troller et al. | 417/423 R |
| 2,542,204 | 2/1951 | Moore | 416/247 R X |
| 2,639,124 | 5/1953 | Stein | 165/125 X |
| 2,731,193 | 1/1956 | Lall et al. | 248/674 X |
| 2,781,165 | 2/1957 | Troller | 417/360 X |
| 3,143,284 | 8/1964 | Lindsjo et al. | 417/363 |
| 3,322,331 | 5/1967 | Kenny et al. | 417/423 R |
| 3,508,729 | 4/1970 | Wilson | 417/423 R X |
| 3,601,502 | 8/1971 | Harter | 248/634 X |
| 3,963,382 | 6/1976 | Patton | 416/247 R |
| 4,218,195 | 8/1980 | Shure | 417/424 X |

FOREIGN PATENT DOCUMENTS

| | | |
|---|---|---|
| 729484 | 12/1942 | Fed. Rep. of Germany . |
| 907341 | 3/1954 | Fed. Rep. of Germany . |
| 1119624 | 6/1956 | France . |
| 2071459 | 9/1971 | France .................................. 98/43 |
| 2084978 | 12/1971 | France . |
| 2379970 | 9/1978 | France . |

Primary Examiner—Albert J. Makay
Assistant Examiner—Harold Joyce
Attorney, Agent, or Firm—Eyre, Mann, Lucas & Just

[57] ABSTRACT

A device for mounting a motor-blower unit at the air inlet of a heating or air-conditioning installation of the passenger space of a motor vehicle, wherein a cylindrical cradle for receiving the motor cage comprises abutments cooperating with a lower edge of the cage, and hooking means formed by longitudinal fingers with resilient attachment, said fingers ending into hooks coming in engagement with an upper edge of the cage for fixing the latter against movement.

18 Claims, 35 Drawing Figures

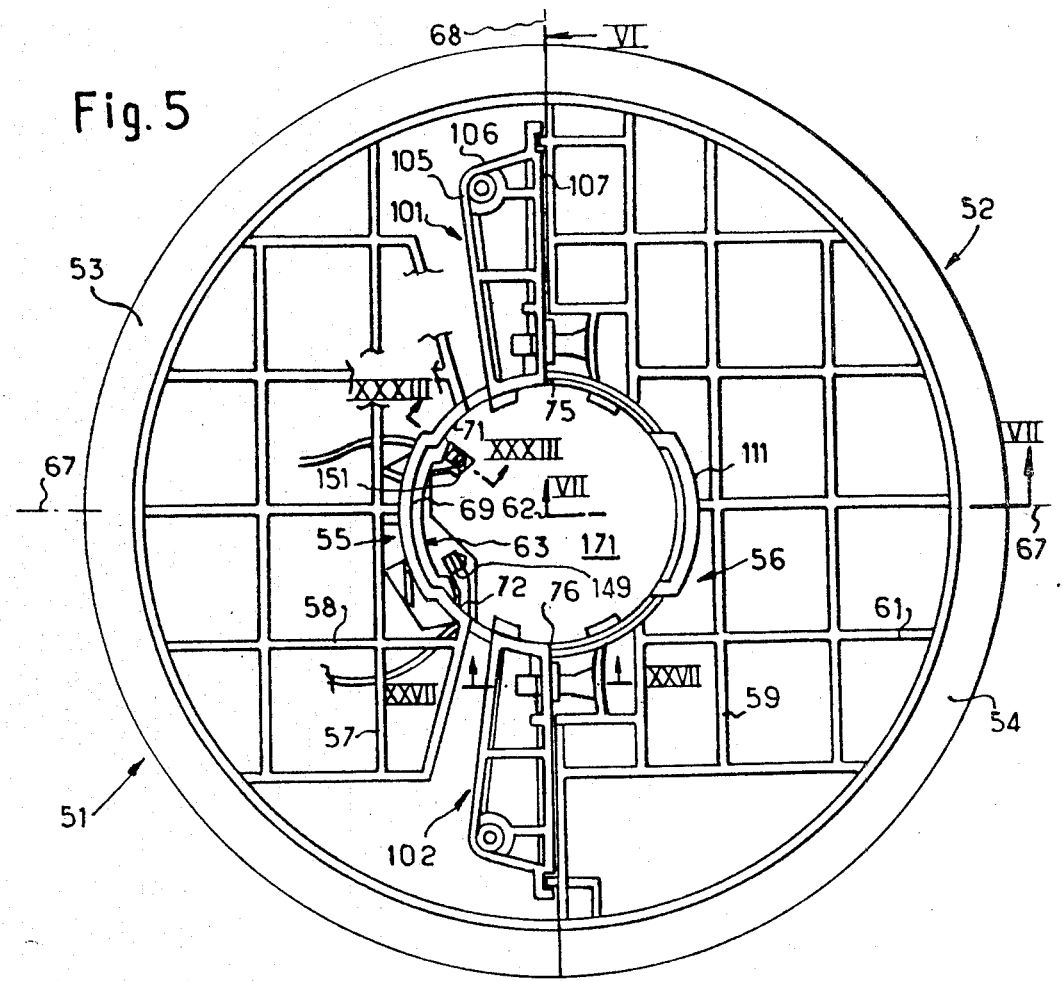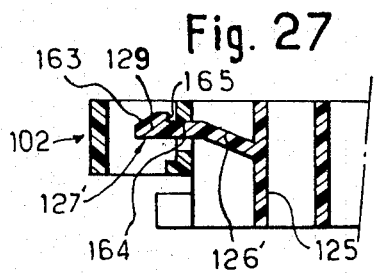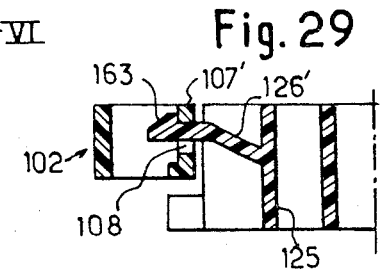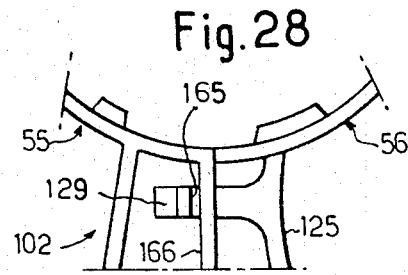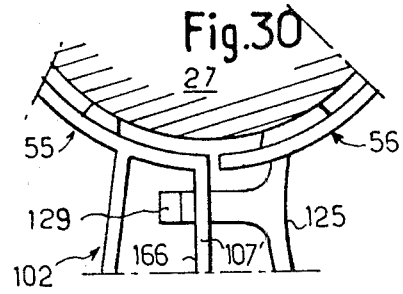

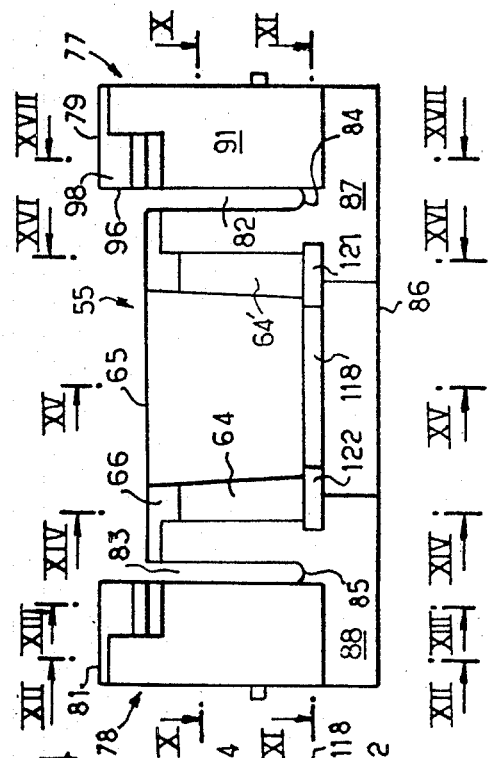

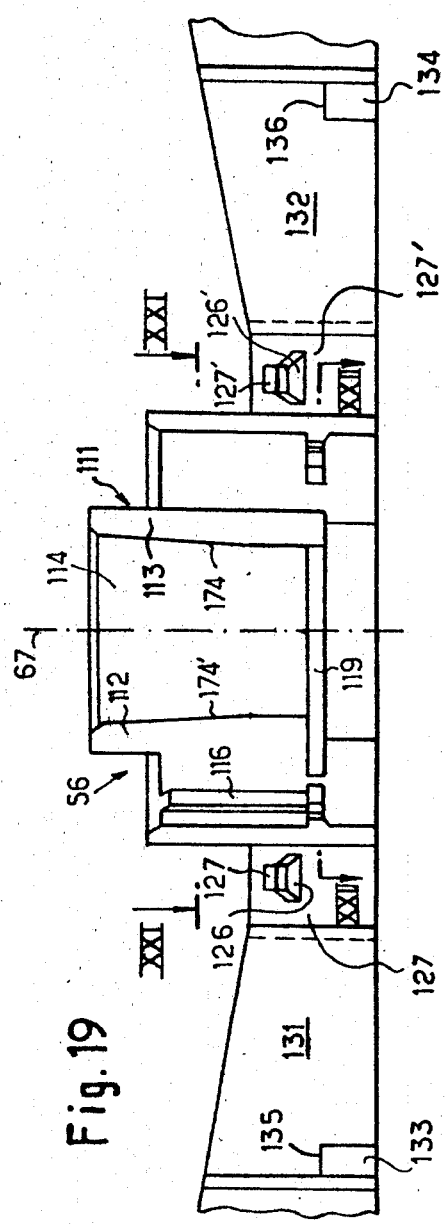
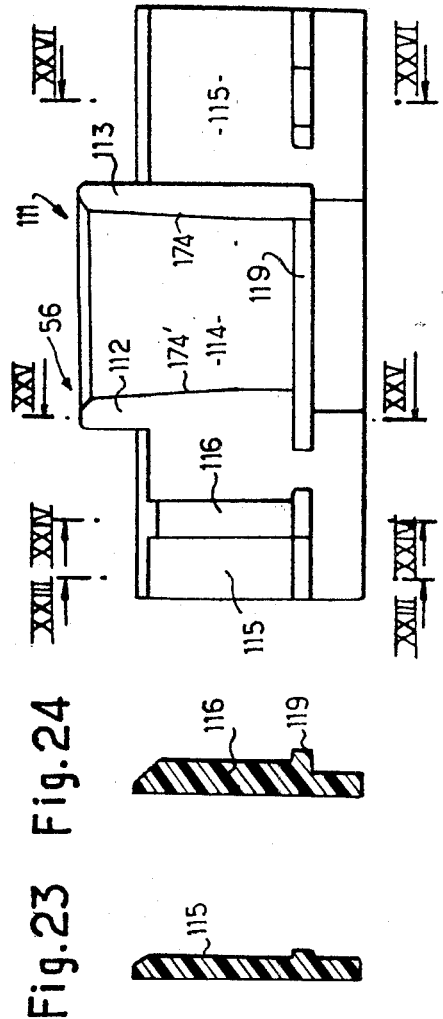

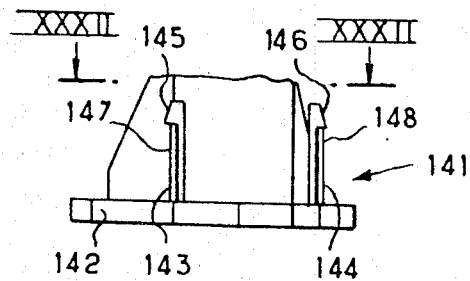
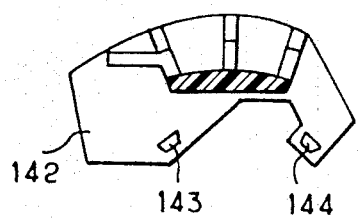
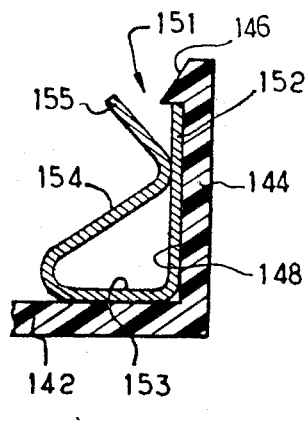
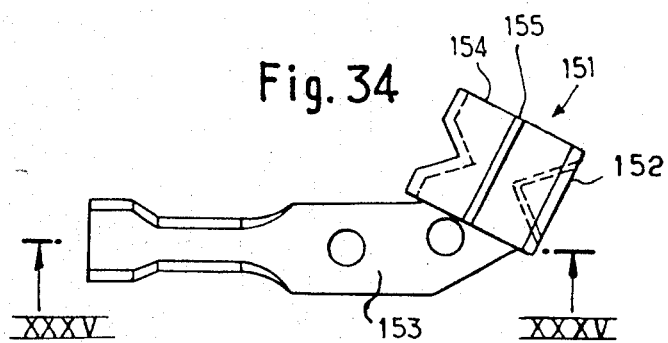
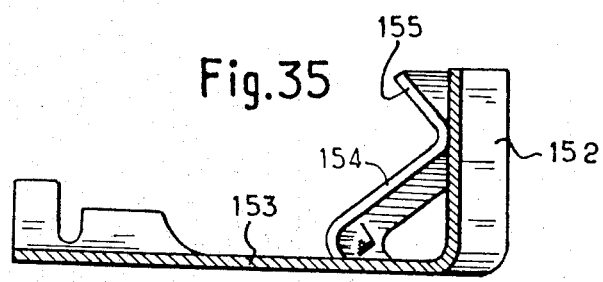

VEHICLE AIR CONDITIONER BLOWER AND MOUNT

The invention relates to a mounting device for a motor-blower unit in a heating and/or air-conditioning installation of the passenger space of a motor vehicle.

It is known that a heating and/or air-conditioning installation of the passenger space of a motor vehicle comprises a casing at one inlet of which is placed a blower which sucks air outside the casing and delivers it inside the latter, the casing containing heating means such as a heat exchanger, as well as means for distributing the air towards various outlets and eventually means for mixing variable proportions of cold air and heated air.

In many installations, the blower and its driving electrical motor are made integral and, being thus coupled, form a motor-blower unit, the blower being usually disposed in an air inlet opening or aperture of the casing.

Hitherto, in order to built in a motor-blower unit into an existing installation, the mounting is relatively lengthy and complicated.

On the other hand, when the heating installation fails in operation, the dismounting of the motor-blower unit is difficult.

In one or the other case, the two operations are particularly costly.

As a matter of fact, the casing is usually made of two halves which have to be taken down and disassembled for mounting the motor-blower unit or for providing an access thereto. Because of this disassembling operation, the settings and the assembly of the installation elements such as the air regulation flaps which are integral with the two halves are interfered with. Moreover, the casing assembly is often an integral part of the instrument board, thereby requiring a dismounting, at least partial, of the latter.

Moreover, hitherto, the transformation of a heating installation into an air-conditioning installation is practically unfeasible. In order to pass from a heating installation to an air-conditioning installation, one has in fact to incorporate the cold generator member, often called evaporator, as well as the members provided for the distribution and regulation of heat and cold.

Such a transformation is presently possible only if the casing has been provided with sufficient dimensions, even if at the origin the vehicle was meant for being fitted with a single heating function.

In all cases, the transformation, when possible, requires either a costly initial installation, or much work, and therefore costs.

The present invention removes such difficulties.

Its object is a mounting device for a motor-blower unit in the casing of a heating and/or air-conditioning installation of the passenger space of a motor vehicle, wherein from the casing depends an inner ring-shaped cradle adapted to the electrical motor cage, means being provided so that the simple introduction via its cage of the motor in the cradle provides, at the end of the movement, through a hooking in or clipping effect, the longitudinal fixation against movement of the motor-blower unit relative to the casing.

In the usual case where the electrical motor cage is formed with peripheral protrusions, at least one corresponding recess or cup of the cradle provides simultaneously the fixation against an angular movement of said cage, and therefore of the motor-blower unit.

The invention provides for that the hooking in or clipping means are operable from the outside so that they may be cleared out of the way and thereby allow the extraction of the unit.

According to one embodiment, said hooking in means are formed on at least one member which can be moved away from the common axis of the cradle and the cage and comprises a transverse branch, so that a longitudinal effort applied on said branch, by means of a rod or similar introduced between two blades of the blower, provides the unclipping, and therefore an immediate disassembly of the motor-blower unit relative to the casing.

The invention provides that the cradle receiving the motor-blower unit is made of two half-cradles rigid with two half-ferrules or half-rings which are part of the casing or housing and connectable to each other by clipping when they are brought close to each other, each half-ferrule, and the corresponding half-cradle, being advantageously provided by molding of a plastics material.

According to one embodiment, the clipping of the two half-ferrules, provided by engagement with hooks molded in one piece and formed on one of the half-ferrules, with tongues, also molded in one piece and formed on the other half-ferrule, is completed by the mounting of the motor-blower unit in the cradle resulting from the assembly of the two half-cradles and which tends to draw said half-cradles apart from each other.

According to a further aspect, the invention provides means for establishing, during the clipping or hooking in of the motor-blower unit in the reception cradle, the electrical connections required for the motor supply, said means being advantageously provided by conductive resilient clamps depending from the cradle, which receive conductive tongues provided on the motor-blower unit.

Figure 3:
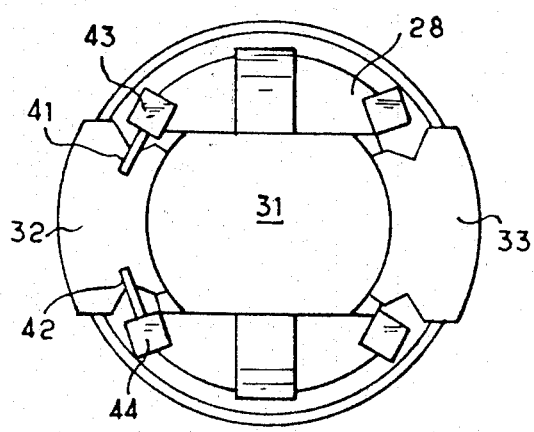
Figure 4:
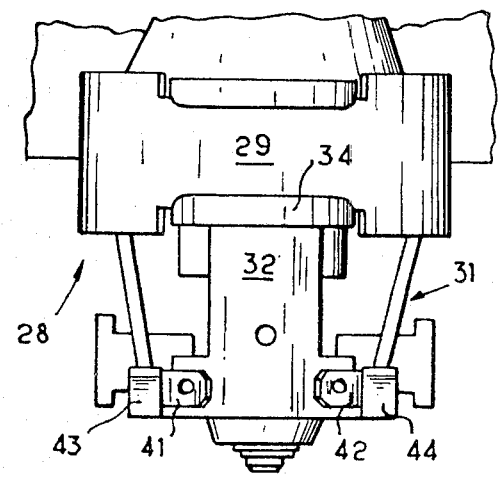
Figure 2:
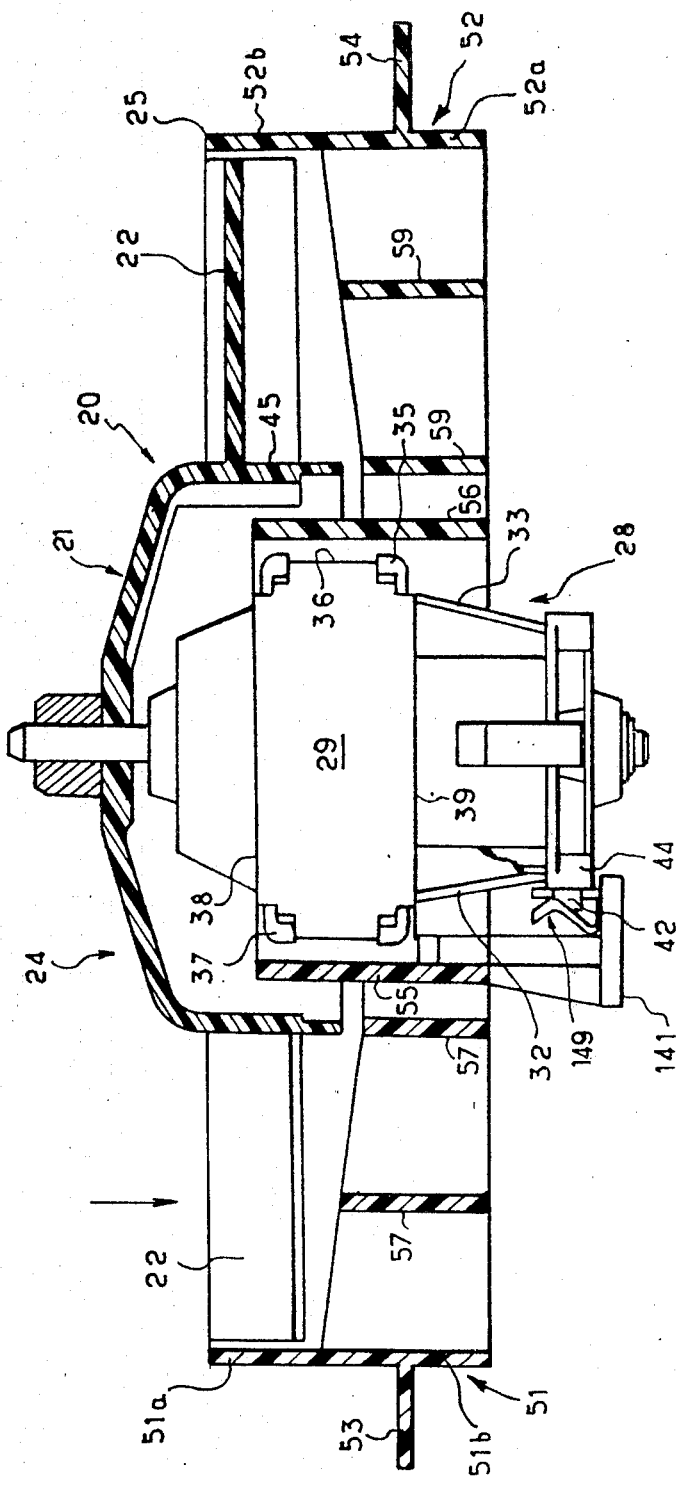
Figure 6:
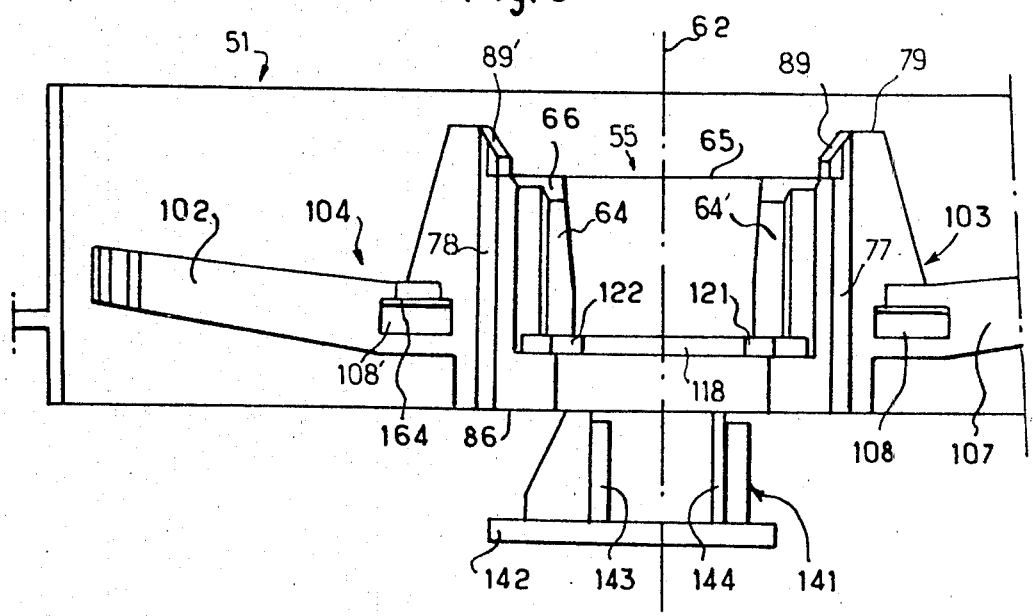
Figure 7:
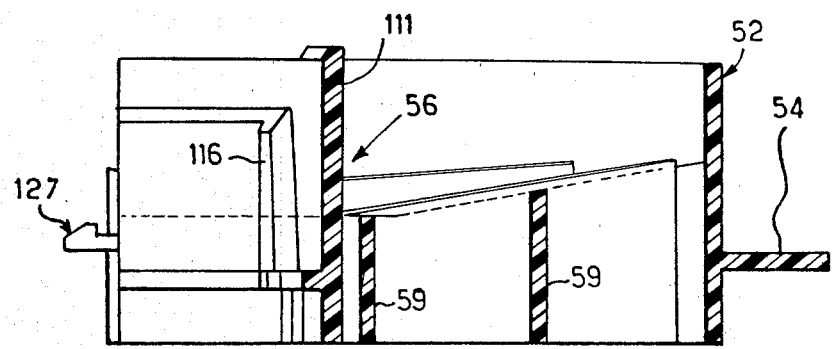
Figure 8:
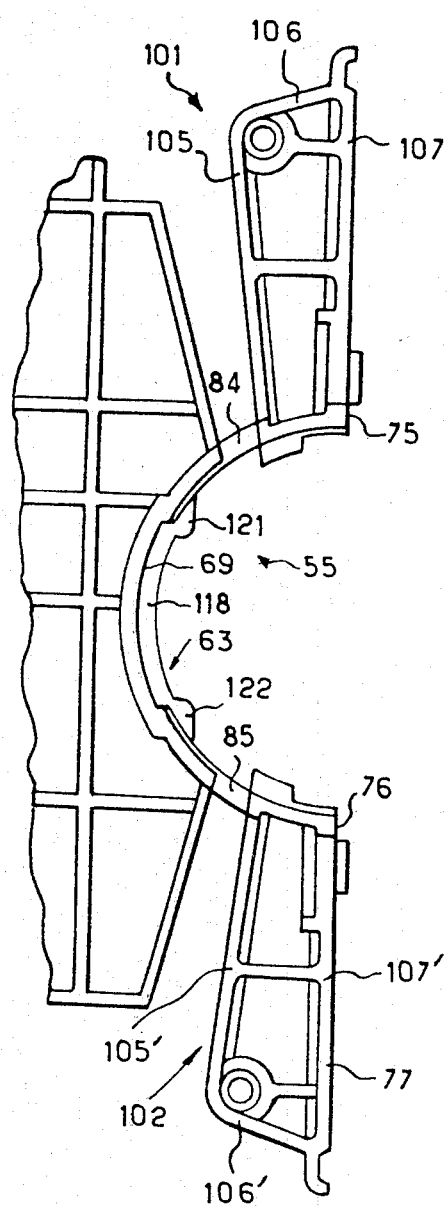
Figure 11:
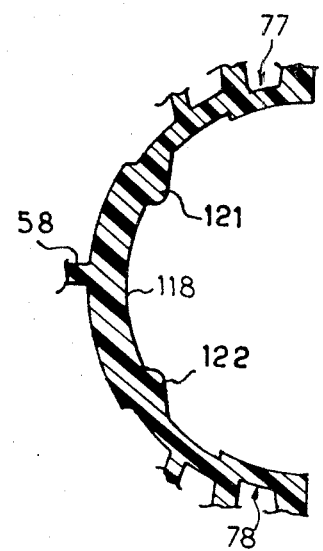
Figure 10:
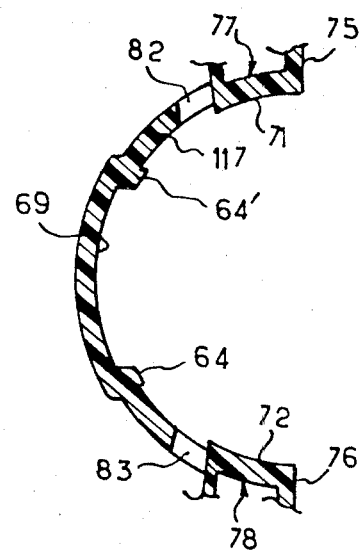
Figure 21:
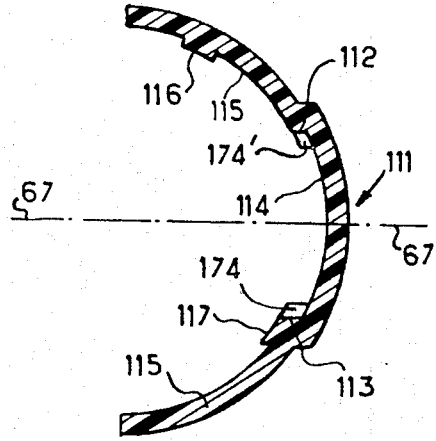
Figure 22:
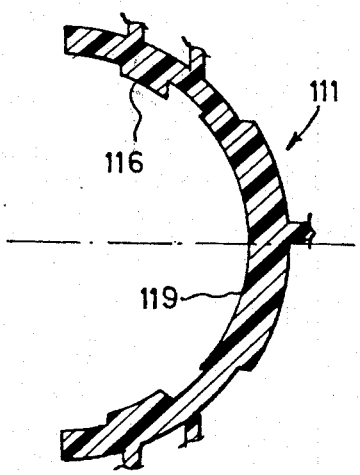
Figure 18:
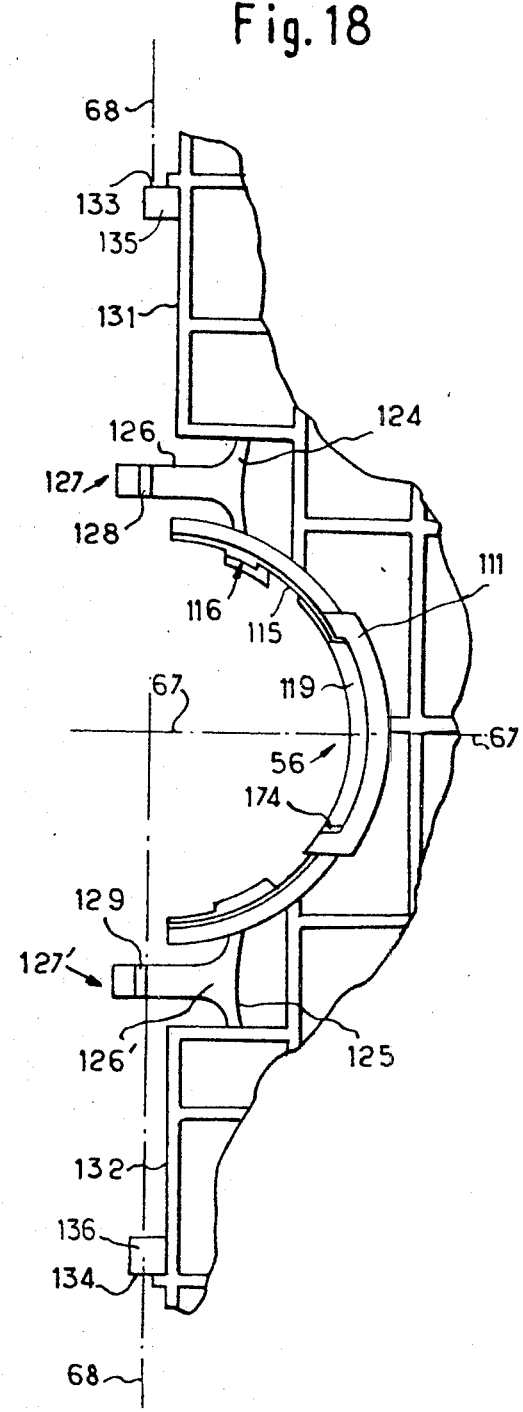

In the following description which is given by way of example, reference is being made to the accompanying drawings wherein:

FIG. 1 is a plan view of the air inlet of a casing or housing provided for a heating and/or air-conditioning installation of the passenger space of a motor vehicle, the motor-blower unit of which is mounted by a device according to the invention, FIG. 2 is a sectional view along line II—II of FIG. 1, FIG. 3 is a view from underneath of the electrical motor which is part of the unit, FIG. 4 is a side view thereof, FIG. 5 is a plan view of a mounting device, FIG. 6 is a view along line VI—VI of FIG. 5, FIG. 7 is a sectional view along line VII—VII of FIG. 5, FIG. 8 is a plan view at an enlarged scale of a portion of a half of the mounting device, FIG. 9 is an elevation developed view of the inside of the half cradle which is part of said half, FIG. 10 is a sectional view along line X—X of FIG. 9, but not developped, FIG. 11 is a sectional view along line XI—XI of FIG. 9, but also not developped, FIG. 12 is a sectional view along line XII—XII of FIG. 9, FIG. 13 is a sectional view along line XIII—XIII of FIG. 9, FIG. 14 is a sectional view along line XIV—XIV of FIG. 9, FIG. 15 is a sectional view along line XV—XV of FIG. 9, FIG. 16 is a sectional view along line XVI—XVI of FIG. 9, FIG. 17 is a sectional view along line XVII—XVII of FIG. 9, FIG. 18 is a view similar to FIG. 8, but for the other half of the device, FIG. 19 is an elevation view as from the inside of said half, FIG. 20 is a developped view of the half-cradle which is part of said half, FIG. 21 is a sectional view along line XXI—XXI of FIG. 19, FIG. 22 is a sectional view along line XXII—XXII of FIG. 9, FIG. 23 is a sectional view along line XXIII—XXIII of FIG. 20, FIG. 24 is a sectional view along line XXIV—XXIV of FIG. 20, FIG. 25 is a sectional view along line XXV—XXV of FIG. 20, FIG. 26 is a sectional view along line XXVI—XXVI of FIG. 20, FIG. 27 is a sectional view along line XXVII—XXVII of FIG. 5, FIG. 28 is a corresponding plan view, FIG. 29 is a view similar to FIG. 27, but for another condition, FIG. 30 is a plan view corresponding to FIG. 29, FIG. 31 is a front view of the lower portion of the mounting device, FIG. 32 is a sectional view along line XXXII—XXXII of FIG. 31, FIG. 33 is a view at a larger scale of a part of the lower portion of the mounting device, in the vicinity of a contact clamp, along line XXXIII—XXXIII of FIG. 5, FIG. 34 is a plan view of a contact clamp, and FIG. 35 is a sectional view along line XXXV—XXXV of FIG. 34.

The motor-blower unit 20, known per se, comprises a rotating hub or hood 21 (FIGS. 1 to 4) made of a plastics material, from where depend blades 22 with relatively narrow intervals 23 therebetween. The rotation of the blower 24, made of said blades, within a cylindrical sleeve 25 which is part of the casing of the heating and/or air-conditioning installation and therefore proximate the peripheral edge 26 of said blades, causes the suction of the air which is outside the sleeve and its delivery towards the inside of the latter.

The motor-blower unit 20 comprises also an electrical motor 28 the cage 29 of which houses the motor armature. A stirrup 31, rigid with cage 29, is formed with two branches 32 and 33 with edges 34 ending into connection bent portions 35 diametrically opposite and protruding relative to the side surface 26 of cage 29. Two similar bent portions 37 overhanging the bent portions 35 protrude on the edge 38 of cage 29 opposite the edge 39 supporting the stirrup 31.

Conductive flexible tongues 41, 42 carried by insulating small columns 43, 44 of parallelepipedal shape are electrically connected to the motor brushes.

The upper part of cage 29 is surrounded over a part of its height by the cylindrical mantle 45 which is part of hood 21 from where depend the blades 22.

The mounting device of the invention of such a motor-blower unit comprises, according to one embodiment (FIGS. 2 to 5) two half-ferrules 51 and 52 of semi-circular shape comprising each two semi-cylindrical wall portions, respectively 51a, 51b and 52a, 52b, said portions being on either side of a semi-circular peripheral rib, respectively 53 and 54.

The assembly 51, 52, 53 and 54 which can be advantageously made of plastics and molded, forms the sleeve 25 through which the blower 24 delivers the air to be heated and/or conditioned in view of the heating and/or conditioning of the passenger space of the motor vehicle.

From each half-ferrule 51 and 52 depends (FIG. 5) a half-cradle, respectively 55 and 56, substantially semi-cylindrical in shape. In the described embodiment, each half-cradle, respectively 55 and 56, is connected to the corresponding half-ferrule, respectively 51 and 52, by a partioning formed by plane partition walls perpendicular to each other 57, 58 and 59, 61, forming an assembly of partition walls hereafter called grid layout for directing the air delivered by the blower 24 parallel to the axis 62 of sleeve 25 (FIGS. 5 and 6).

The inner surface 63 of the half-cradle 55 (FIGS. 5, 6 and 8) has a general semi-cylindrical configuration but is formed with two longitudinal ribs 64 and 64' having each a substantially rectangular cross-section and being connected to the upper edge 65 by a bevelled face 66 (FIG. 14). On either side of a diametrical plane 67 (FIG. 5), perpendicular to the junction diametral plane 68 between the two halves 51 and 52, the inner surface 69 of the half cradle 55 is slightly standing back relative to surfaces 71 and 72, also cylindrical, which reach the vertical edges 75 and 76 bounding the half-cradle (FIG. 10). The two ribs 64, 64' bound between themselves a rounded bottom recess or channel 69 for receiving and guiding an edge 34, 35 protruding on the side surface 36 of the motor cage. Advantageously, the opposite faces of the two ribs 64, 64' are more apart from each other at the level of the upper edge 65 than at the level of their medium portion (FIGS. 6 and 9).

Between said vertical edges 75 and 76 and deep notches, respectively 82 and 83, the half-cradle 65 is formed with lugs 77 and 78 (FIGS. 6 and 9) the upper edges of which, respectively 79 and 81, are higher than the upper edge 65 of the remaining part of the half-cradle.

The notches 82 and 83 are formed with bottoms, respectively 84 and 85, which are relatively little remote from the lower edge 86 of the half-cradle; thus, the portions of the latter, respectively 87 and 88, which are between the bottoms 84 and 85 and the edge 86 from resiliently deformable ties for the lugs, respectively 77 and 78.

The upper portion of each lug, for example lug 77, is formed on its inner face (FIG. 17) from the upper edge 79 with an oblique or bevelled face 89 which is connected to the remaining part of surface 91 via a transverse plane 92 so as to form a hook 93 and a recess 172 against which comes to bear the edge of the motor-blower unit cage once it is introduced. This recess provides a safe contact surface for the edge of the cage and thereby removes the effects of eventual deformations of the lug 77 as regards its surface 91. The bevelled face 89 is inclined not only for coming nearer axis 62 of the half cradle as from the upper edge 79, but also for coming nearer the inner surface 91 of lug 77 as from the edge 96 bounding the deep notch 82.

The same elements pertaining to lug 77 are seen on the other leg 78 in FIG. 13, with the same reference numerals to which is added the inded "'''".

From the outer faces of lugs 77 and 78 depends hollowed transverse arms (FIG. 8) 101 and 102, each lug and each arm thereby forming a rigid square, respectively 103 and 104 (FIG. 6). The arm 101 is bounded by vertical walls 105, 106 and 107 (FIG. 8), the latter being the limit of the half cradle.

The arm 102, of identical construction as arm 101, is bounded by the vertical walls 105', 106' and 107' (FIG. 8).

The walls 107 and 107' are formed with rectangular openings 108, 108' (FIG. 6).

The other half-ferrule 62 has a construction which is practically similar to that of the first.

However, the half-cradle 56 is not formed with deep notches and therefore does not define lugs (FIG. 20).

On the other hand, in its medial portion (FIGS. 18 and 21), said half-cradle is formed with a channel-shaped recess 111 of greater height than the remaining part of the half-cradle and formed with edges 112 and 113, the inner surfaces 174 and 174' of the recess being slightly inclined in order to be nearer to plane 67 in their lower portion than in their upper portion (FIG. 21). Said surfaces 174 and 174' are connected to each other by an inner cylindrical surface 114.

The inner surface 115 of the remaining part of the half-cradle 56 has the general configuration of a cylinder but is formed with two longitudinal ribs 116 and 117 of substantially rectangular cross-section, which are practically similar to ribs 64 and 64' of cradle 65, and which reach a ring-shaped abutment surface 119.

The ribs 64 and 64' of cradle 55 also reach a ring-shaped abutment surface 118 (FIGS. 8 and 9) which, opposite said ribs, is formed with rounded protruding portions, respectively 121 and 122.

Two relatively thin walls, respectively 124 and 125 (FIG. 18), are present between the grid layout and the half-cradle 56, on either side of the latter. Each of them has a configuration which is advantageously curved, with its convexity turned towards the diametral plane 68.

From the curved walls 124 and 125 depend the bodies 126 and 126' of hooks 127 and 127' which end into a nose, respectively 128 and 129 (FIG. 27).

At their lower portions, the walls 131 and 132 (FIGS. 18 and 19) which are part of the grid layout are formed with small abutment blocks 133 and 134 with operating upper faces 135 and 136.

From the half-cradle 55 depends molded in one piece with it (FIGS. 6, 31 and 32) a shield 41 protruding towards the bottom and formed with a base 142 from where depend small columns 143 and 144 of general prismatic shape, the upper portions of which end into outer bevels 145 and 146. On the base 142 and stuck against the outer faces 147 and 148 of the small columns 143 and 144 are conductive clamps respectively 149 and 151, made of a resilient flat ribbon, and comprising each an upright 152 (FIGS. 33 to 35) stuck to the face 147 of the small columns 143, a bottom 153 used for its fixation to the base 142, and a bent leg 154, the end 155 of said leg and the upper end of the upright 152 forming the entrance into the clamp.

According to one of the aspects of the invention, for forming the sleeve 25 of the motor-blower unit 20 and more particularly of the blower 24, one needs only to bring the two half-ferrules 51 and 52 close to each other.

At the end of the movement bringing them together (FIGS. 27 and 28), the oblique faces 163 of the noses 128 and 129 belonging to the hooks 127, 127' of cradle 126 come to bear against the edges 164 of the openings 108 and 108' formed on the two arms 101 and 102. As the movement proceeds for bringing the two half-ferrules 51 and 52 close to each other, the bodies 126 and 126' become inflected due to their resiliency, thereby allowing the hooks 127 and 127' to pass completely the openings 108 and both of them to assume a position in which their abutment faces 165 are opposite faces 166 of walls 107, 107' of arms 101 and 102. Advantageously, there remains a certain interval between the abutment faces 165 of the hooks and the opposite faces 166 of walls 107, 107'.

According to another aspect of the invention, the mounting and fixation of the motor-blower unit is simplified to the extreme in the sleeve thus formed.

Likewise, according to still another aspect of the invention, the electrical supply of the unit motor is provided with manual intervention inside said sleeve.

For so doing, one needs only to take the motor-blower unit 20 and present it, with the electrical motor 28, facing the opening 171 bounded by the two half-cradles 55 and 56. The two conductive clamps 149 and 151 being visible through said opening (FIG. 5), the presentation is done so that the conductive tongues 41 and 42 of the electrical motor are substantially opposite said clamps, although a very accurate precision is not actually required in their respective alignment.

The motor-blower unit is then pushed inside the opening which is kept clear by the two half-cradles. The first contact with the cradle is done through the bends 34, 35 engaging the recess 111 and the recess bounded by the ribs 64, 64'.

The latter exert then a centering effect from an angular stand point by the oblique inner surfaces 174 and 174' and the oblique faces of ribs 64 and 64', and also from the axial stand point by the engagement of the ribs 117, 116 and 64, 64' with the cylindrical surfaces 36 of cage 29.

During the driving-in operation, said surface 36 is engaged with the ribs 117, 116, 64 and 64'. The dimensions which are determined on the one hand by the inner surfaces of the two half-cradles 55 and 56 and the ribs 117, 116, 64 and 64', and on the other hand by the cylindrical surface 36 of cage 29, are chosen such that this driving-in operation urges the two half casings 55, 56 away from each other, so that the abutment faces 165 of the noses 128, 129 of the hooks come nearer the opposite faces 166 of walls 107, 107' of the other half casing until a contact is estabished and until the thin curved walls 124 and 125 from which depend said hooks are put under tension. A mounting absolutely without clearance is thereby provided (FIGS. 29 and 30).

At the end of the introduction of the motor-blower unit, the conductive tongues 41 and 42 (FIG. 4) which are in fact the electrical supply terminals of the motor 28, are placed opposite the opening of the conductive clamps 149 and 151 (FIG. 33) and, if required, a slight alignment correction takes place through the cooperation of the oblique faces 145 and 146 of the small columns 143 and 144 with the prismatic blocks 43 and 44 (FIGS. 3 and 4) on which are fixed the tongues 41 and 42.

At the beginning of the driving-in movement, the lower edge 39 of the cage 29 of the electrical motor 28 (FIG. 2) is engaged with the oblique faces 89 and 89' of lugs 77 and 78 (FIGS. 13 and 17) formed on the half-cradle 55 (FIG. 8) and, under the pressure exerted by the whole of the motor-blower unit, said lugs 77 and 78 open due to the resiliency of their connections 87 and 88 (FIG. 9) to the body of the half-cradle 55.

At the end of the movement, the lower edge 39 of cage 36 (FIG. 2) comes to bear against the upper faces of the transverse ring-shaped surfaces 118 and 119 (FIGS. 14 and 19) of the half-casings, and the upper edge 38 of the cage escaping then from the noses 93 and 93' formed by the upper portion of the lugs 77 and 78, the latter, by a snap-in effect, coming to bear against the side surface of the cage, the abutment faces 92, 92' of the hooks 93, 93' fixing the unit against a longitudinal extraction movement, by retaining the upper edge 38 of the cage.

If for any reason one wishes to extract the motor-blower unit, one needs only to exert a pressure action downwardly on branches 101 and 102 of the squares 103 and 104. The hooks 93 and 93' which are at the end of the squares 103 and 104 are retracted and the motor-blower unit is removed by a simple upward traction.

This pressure action is limited in the longitudinal direction by the upper surfaces 135 and 136 of the abutments 133 and 134 located on the walls 131 and 132 of the half-ferrule 52, thereby avoiding any damage risk.

One should remark that the rigidity of the squares 103 and 104 or arms 101 and 102 is important and even indispensible for the resilient effect of the connections 87 and 88 to be correctly effected. As a matter of fact, a lack of rigidity of said arms would cause a resilient effect in other locations in the arm, the clipping function of hooks 93 and 93' would not operate and the disengagement of the motor-blower unit could not be carried out.

One can thus proceed to a repair of the electrical motor or else replace a warn out motor-blower unit by a new unit.

The mounting may be carried out by hand. But it can also be carried out automatically. To this effect, one takes advantage of the presence of the ventilation holes of the electrical motor, which are at least two in number and are formed in the hood 21, as is shown in chain-dot lines in FIG. 1. They allow the passage of a fork-shaped tool which is magnetized, the magnetic attraction thereby created between the tool and the rotor of the motor-blower unit allowing the gripping of said unit.

So, one can easily transform a heating installation into an air-conditioning installation.

For so doing, one needs only to remove the motor-blower unit and to replace it by an unit providing the production of cold and the distribution of warmth and of cold and which could use the assembly means hereabove described. The transformation is then made easy since one needs not to disassemble the air-conditioning casing.

We claim:

1. A device for mounting a motor-blower unit at the air inlet of a heating or air-conditioning installation of the passenger space of a motor vehicle, said motor-blower unit having a motor cage and said device comprising a cylindrical cradle for receiving and supporting the motor cage and which is provided with abutments for cooperating with a lower edge of the cage, wherein the cradle comprises hooking means formed by longitudinal fingers with resilient attachment, opening out when the motor cage is driven into the cradle and bearing against the cage at the end of the driving-in movement, said fingers ending into hooks which come in engagement with an upper edge of the cage for fixing the latter against movement.

2. A device according to claim 1, wherein the cradle comprises axial and angular guiding means of the motor cage.

3. A device according to claim 1, wherein, the cradle being made of a plastics material, the resiliency of the fingers is provided by the narrowness of their attachment to the cradle body.

4. A device according to claim 3, wherein outer protrusions connected to the resilient fingers depend from the cradle for controlling the opening out of said fingers.

5. A device according to claim 4, wherein one outer protrusion and one resilient finger are shaped according to a square.

6. A device according to claim 5, wherein a branch of the square which is perpendicular to the finger is of clear access in spite of the presence of the motor-blower unit mounted into the device.

7. A device according to claim 3, wherein the upper ends of the fingers have a slightly excentered face.

8. A device according to one of the preceding claims, wherein the cradle is formed by the assembly of two half-cradles.

9. A device according to claim 8, wherein the resilient fingers are adjacent the assembly edges of two half-cradles.

10. A device according to claim 8, which is further formed of two halves with a diametral junction, each of which comprises a half-cradle.

11. A device according to claim 10, wherein each half comprises a half-ferrule, the two half-ferrules bounding after the assembly the circulation sleeve where the air is circulated by the unit blower.

12. A device according to claim 8, wherein the two halves comprise means for their assembly by gripping or clipping when they are brought near each other.

13. A device according to claim 10, wherein one half is formed with an assembly hook resiliently mounted and the other with an opening for the engagement of the hook when being brought near each other.

14. A device according to claim 13, wherein an opening is provided on one branch operating the opening out of the finger.

15. A device according to claim 12, wherein the assembly means of the two halves are such that after their hooking in, there remains an intentional clearance, said clearance being cancelled when driving-in the electrical motor cage inside the cradle.

16. A device according to claim 15, wherein the hooking means, when the two halves are being assembled, are put under tension when the cage is completely driven in.

17. A device according to claim 1 or 2, wherein the cradle comprises means capable of cooperation with crimpings in relief formed on the cage for providing the angular positioning of the unit.

18. A device according to claim 17, wherein conductive resilient clamps depending from the cradle are capable of receiving unit conductive tongues for the electrical supply of the motor.

* * * * *